United States Patent
Chung et al.

(10) Patent No.: US 6,195,760 B1
(45) Date of Patent: Feb. 27, 2001

(54) METHOD AND APPARATUS FOR PROVIDING FAILURE DETECTION AND RECOVERY WITH PREDETERMINED DEGREE OF REPLICATION FOR DISTRIBUTED APPLICATIONS IN A NETWORK

(75) Inventors: Pi-Yu Chung, Berkeley Heights; Yennun Huang, Bridgewater, both of NJ (US); Deron Liang, Taiwan (CN); Chia-Yen Shih, Murray Hill; Shalini Yajnik, Scotch Plains, both of NJ (US)

(73) Assignees: Lucent Technologies Inc, Murray Hill, NJ (US); Academia Sinica

( * ) Notice: Subject to any disclaimer, the term of this patent is extended or adjusted under 35 U.S.C. 154(b) by 0 days.

(21) Appl. No.: 09/119,140

(22) Filed: Jul. 20, 1998

(51) Int. Cl.$^7$ .................................................. G06F 11/08
(52) U.S. Cl. ..................................... 714/4; 714/6; 714/13; 714/57; 709/223
(58) Field of Search ................................. 714/4, 6, 7, 11, 714/13, 16, 47, 57; 709/223–224; 707/202, 204

(56) References Cited

U.S. PATENT DOCUMENTS

| | | | |
|---|---|---|---|
| 5,303,243 | * 4/1994 | Anezaki | 371/9.1 |
| 5,664,090 | * 9/1997 | Seki et al. | 395/182.13 |
| 5,666,486 | * 9/1997 | Alfieri et al. | 395/200.47 |
| 5,978,791 | * 11/1999 | Farber et al. | 707/2 |

* cited by examiner

Primary Examiner—Robert W. Beausoliel, Jr.
Assistant Examiner—Scott T. Baderman
(74) Attorney, Agent, or Firm—Stephen M. Gurey

(57) ABSTRACT

An application module (A) running on a host computer in a computer network is failure-protected with one or more backup copies that are operative on other host computers in the network. In order to effect fault protection, the application module registers itself with a ReplicaManager daemon process (112) by sending a registration message, which message, in addition to identifying the registering application module and the host computer on which it is running, includes the particular replication strategy (cold backup, warm backup, or hot backup) and the degree of replication associated with that application module. The backup copies are then maintained in a fail-over state according to the registered replication strategy. A WatchDog daemon (113), running on the same host computer as the registered application periodically monitors the registered application to detect failures. When a failure, such as a crash or hangup of the application module, is detected, the failure is reported to the ReplicaManager, which effects the requested fail-over actions. An additional backup copy is then made operative in accordance with the registered replication style and the registered degree of replication. A SuperWatchDog daemon process (115-1), running on the same host computer as the ReplicaManager, monitors each host computer in the computer network. When a host failure is detected, each application module running on that host computer is individually failure-protected in accordance with its registered replication style and degree of replication.

22 Claims, 2 Drawing Sheets

| APPLICATION MODULE | REPLICATION STYLE (COLD, WARM, HOT) | DEGREE OF REPLICATION | HOST COMPUTER | WHERE COPY OF MODULE FOUND ON HOST | MODULE ID | PRIMARY(P), BACKUP(B), IDLE(I) |
|---|---|---|---|---|---|---|
| A | WARM | 3 | H1 | /HOME/CHUNG/A.EXE | $A_1$ | P |
| | | | H2 | /HOME/CHUNG/A.EXE | $A_2$ | B |
| | | | H3 | /HOME/CHUNG/A.EXE | $A_3$ | B |
| | | | H4 | /HOME/CHUNG/A.EXE | $A_4$ | I |
| B | HOT | 2 | H1 | /HOME/CHUNG/B.EXE | $B_2$ | P |
| | | | H4 | /HOME/CHUNG/B.EXE | $B_1$ | P |
| | | | H5 | /HOME/CHUNG/B.EXE | $B_3$ | I |
| C | COLD | 2 | H3 | /HOME/CHUNG/C.EXE | $C_1$ | P |
| | | | H6 | /HOME/CHUNG/C.EXE | $C_2$ | I |

FIG. 2

| APPLICATION MODULE | REPLICATION STYLE (COLD, WARM, HOT) | DEGREE OF REPLICATION | HOST COMPUTER | WHERE COPY OF MODULE FOUND ON HOST | MODULE ID | PRIMARY(P), BACKUP(B), IDLE(I) |
|---|---|---|---|---|---|---|
| A | WARM | 3 | H1 | /HOME/CHUNG/A.EXE | $A_1$ | P |
| | | | H2 | /HOME/CHUNG/A.EXE | $A_2$ | B |
| | | | H3 | /HOME/CHUNG/A.EXE | $A_3$ | B |
| | | | H4 | /HOME/CHUNG/A.EXE | $A_4$ | I |
| B | HOT | 2 | H1 | /HOME/CHUNG/B.EXE | $B_2$ | P |
| | | | H4 | /HOME/CHUNG/B.EXE | $B_1$ | P |
| | | | H5 | /HOME/CHUNG/B.EXE | $B_3$ | I |
| C | COLD | 2 | H3 | /HOME/CHUNG/C.EXE | $C_1$ | P |
| | | | H6 | /HOME/CHUNG/C.EXE | $C_2$ | I |

METHOD AND APPARATUS FOR PROVIDING FAILURE DETECTION AND RECOVERY WITH PREDETERMINED DEGREE OF REPLICATION FOR DISTRIBUTED APPLICATIONS IN A NETWORK

CROSS REFERENCE TO RELATED APPLICATIONS

This application describes and claims subject matter that is also described in our co-pending United States patent application filed simultaneously herewith and entitled: "METHOD AND APPARATUS FOR PROVIDING FAILURE DETECTION AND RECOVERY WITH PREDETERMINED REPLICATION STYLE FOR DISTRIBUTED APPLICATIONS IN A NETWORK", Ser. No. 09/119,139.

TECHNICAL FIELD

This invention relates to detection of a failure of an application module running on a host computer on a network and recovery from that failure.

BACKGROUND OF THE INVENTION

In order for an application module running on a host computer in a network to provide acceptable performance to the clients accessing it, the application module must be both reliable and available. In order to provide acceptable performance, schemes are required for detecting the failure of an application module or the entire host computer running it, and for then quickly recovering from such a detected failure. Replication of the application module on other host computers in the network is a well known technique that can be used to improve reliability and availability of the application module.

Three strategies are known in the art for operating and configuring the fail-over process as it applies to the replicas, or backup copies, of an application module and which define a state of preparedness for these backups. In the first strategy, known as a "cold backup" style, only the primary copy of an application module is running on a host computer and other backup copies remain idle on other host computers in the network. When a failure of the primary copy of the application module is detected, the primary copy of the application module is either restarted on the same host computer, or one of the backup copies of the application module is started on one of the other host computers, which backup then becomes the new primary. By using a checkpointing technique to periodically take "snapshots" of the running state of the primary application module, and storing such state in a stable storage media, when a failure of the primary application module is detected, the checkpoint data of the last such stored state of the failed primary application module is supplied to the backup application module to enable it to assume the job as the primary application module and continue processing from such last stored state of the failed primary application module.

The second strategy is known as a "warm backup" style. Unlike the cold backup style in which no backup of an application module is running at the same time the primary application module is running, in the warm backup style one or more backup application modules run simultaneously with the primary application module. The backup application modules, however, do not receive and respond to any client requests, but periodically receive state updates from the primary application module. Once a failure of the primary application module is detected, one of the backup application modules is quickly activated to take over the responsibility of the primary application module without the need for initialization or restart, which increases the time required for the backup to assume the processing functions of the failed primary.

The third strategy is known as a "hot backup" style. In accordance with this style, two or more copies of an application module are active at run time. Each running copy can process client requests and states are synchronized among the multiple copies. Once a failure in one of the running application modules is detected, any one of the other running copies is able to immediately take over the load of the failed copy and continue operations.

Unlike the cold backup strategy in which only one primary is running at any given time, both the warm backup and hot backup strategies advantageously can tolerate the coincident failure of more than one copy of a particular application module running in the network, since multiple copies of that application module type are simultaneously running on the network.

Each of the three replication strategies incur different run-time overheads and have different recovery times. One application module running on a network may need a different replication strategy based on its availability requirements and its run time environment than another application module running on the same host computer or a different host computer within the network. Since distributed applications often run on heterogeneous hardware and operating system platforms, the techniques to enhance an application module's reliability and availability must be able to accommodate all the possible replication schemes.

In U.S. Pat. No. 5,748,882 issued on May. 5, 1998 to Y. Huang, a co-inventor of the present invention, which patent is incorporated herein by reference, an apparatus and a method for fault tolerant computing is disclosed. As described in that patent, an application or process is registered with a "watchdog" daemon which then "watches" the application or process for a failure or hangup. If a failure or hangup of the watched application is detected, then the watchdog restarts the application or process. In a multi-host distributed system on a network, a watchdog daemon at a host computer monitors registered applications or processes on its own host computer as well as applications or processes on another host computer. If a watched host computer fails, the watchdog daemon that is watching the failed host computer restarts the registered processes or applications that were running on the failed watched node on its own node. In both the single node and multiple node embodiments, the replication strategy for restarting the failed process or application is the cold backup style, i.e., a new replica process or application is started only upon the failure of the primary process or application.

Disadvantageously, prior art fault-tolerant methodologies have not considered and are not adaptable to handle multiple different replication strategies, such as the cold, warm and hot backup styles described above, that might best be associated with each individual application among a plurality of different applications that may be running on one or more machines in a network. Furthermore, no methodology exists in the prior art for maintaining a constant number of running applications in the network for the warm and hot backup replication styles.

SUMMARY OF THE INVENTION

In accordance with the present invention, an application module running on a host computer is made reliable by first registering itself for its own failure and recovery processes. A ReplicaManager daemon process, running on the same host computer on which the application module is running or on another host computer connected to the network to which the application module's machine is connected, receives a registration message from the application module. This registration message, in addition to identifying the registering application module and the host machine on which it is running, includes the particular replication strategy (cold, warm or hot backup style) and the degree of replication to be associated with the registered application module, which registered replication strategy is used by the ReplicaManager to set the operating state of each backup copy of the application module as well as to maintain the number of backup copies in accordance with the degree of replication. A Watchdog daemon process, running on the same host computer as the registered application module then periodically monitors the registered application module to detect failures. When the Watchdog daemon detects a crash or a hangup of the monitored application module, it reports the failure to the ReplicaManager, which in turn effects a fail-over process. Accordingly, if the replication style is warm or hot and the failed application module cannot be restarted on its own host computer, one of the running backup copies of the primary application module is designated as the new primary application module and a host computer on which an idle copy of the application module resides is signaled over the network to execute that idle application. The degree of replication is thus maintained thereby assuring protection against multiple failures of that application module. If the replication style is cold and the failed application is cannot be restarted on its own host computer, then a host computer on which an idle copy of the application module resides is signaled over the network to execute the idle copy. In order to detect a failure of a host computer or the Watchdog daemon running on a host computer, a SuperWatchDog daemon process, running on the same host computer as the ReplicaManager, detects inputs from each host computer. Upon a host computer failure, detected by the SuperWatchDog daemon by the lack of an input from that host computer, the ReplicaManager is accessed to determine the application modules that were running on that host computer. Those application modules are then individually failure-protected in the manner established and stored in the ReplicaManager.

BRIEF DESCRIPTION OF THE DRAWING

FIG. 2 shows a table stored in the ReplicaManager daemon, running on a host computer in the network in FIG. 1, that associates, for each type of application module, information used to effect failure protection in accordance with the present invention.

DETAILED DESCRIPTION

Figure 1:
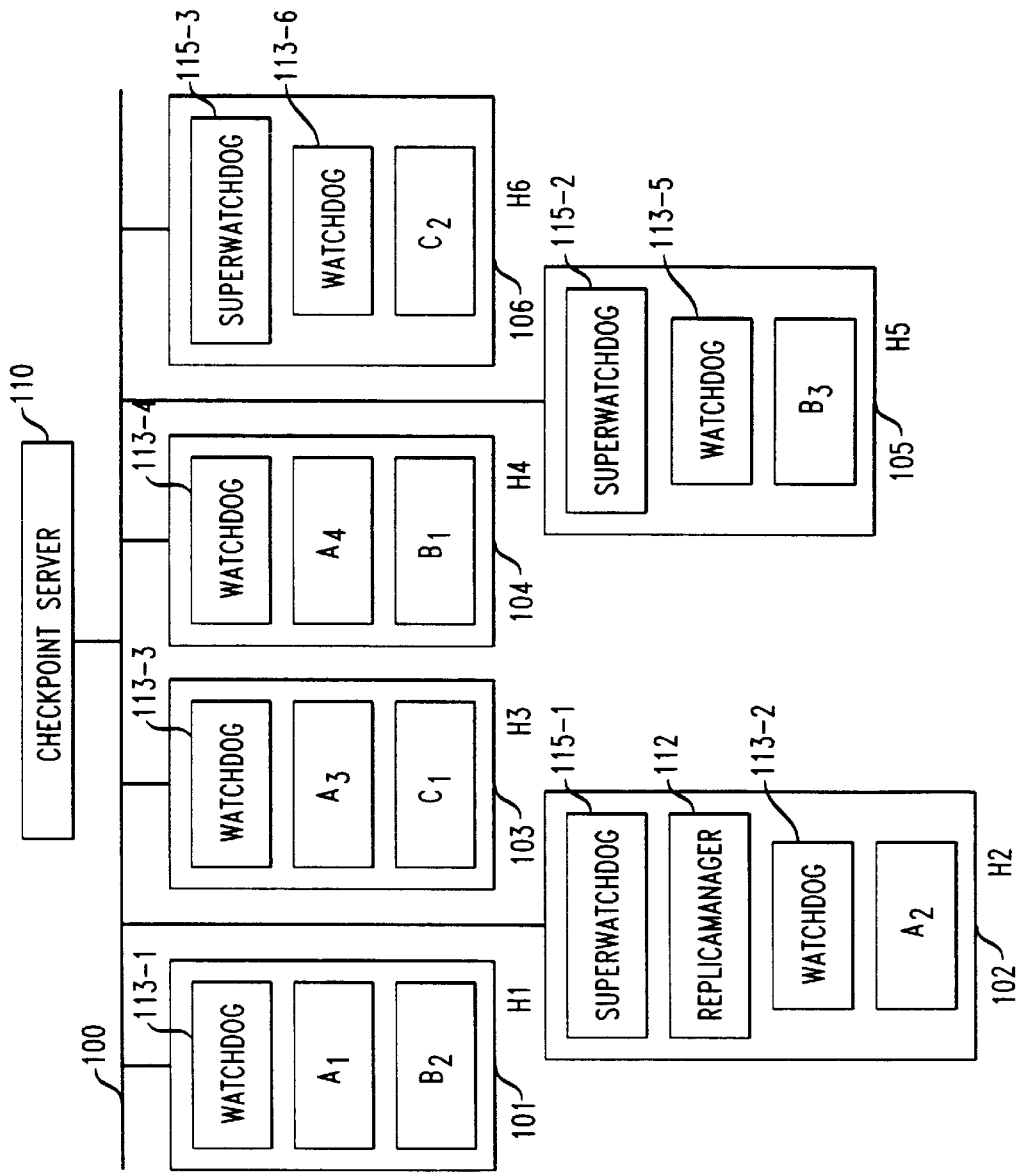
FIG. 1 is a block diagram of a computer network illustratively showing a plurality of host computers running application modules which are failure protected in accordance with the present invention.

With reference to FIG. 1, a network 100 is shown, to which is connected a plurality of host computers. The network 100 can be an Ethernet, an ATM network, or any other type of data network. For illustrative purposes only, six host computers H1, H2, H3, H4, H5 and H6, numerically referenced as 101, 102, 103, 104, 105, and 106, respectively, are connected to the network 100. Each host computer has a plurality of different application modules residing in its memory. These application modules, being designated in FIG. 1 as being of a type A, B and C, each has a primary copy executed and running on at least one of these six host computers. Specifically, in this illustrative example, a primary copy of the type A application module, application module $A_1$, is running of host computer H1, a primary copy of the type B application module, application module $B_1$, is running on host computer H4, and a primary copy of the type C application module, application module $C_1$, is running on host computer H3. Other copies of each type of application module, as will be described, are either stored and available from memory on at least one of the other host computers in an idle state awaiting later execution, or are running as a backup copies or second primary copies of application modules.

As previously described, an application module running on a host computer is fault-protected by one or more backup copies of the application module that are operated in a state of preparedness defined by one of three known replication styles. Each replication style has its own method of providing backup to an application module which fails by means of crashing or hanging up, or to all those application modules residing on a host computer that itself fails. In accordance with the present invention, each application module type is fault-protected with the specific replication style, (cold backup, warm backup, hot backup) that is best suited to its own processing requirements. Furthermore, in accordance with the present invention, each application module type is fault-protected with a degree of replication specified for that application module, thereby maintaining a constant number of copies of that application module in a running state for protection against multiple failures of that type of application module.

In order for an idle or backup application module to assume the functioning of a failed primary application module upon failure-detection with a minimum of processing disruption, the last operating state of the failed application module must be provided to the backup or idle application module upon its execution from the idle state or upon its being designated as the new primary application module. A Checkpoint Server 110 connected to network 110 periodically receives from each fault-protected application module running on the network the most current state of that application, which state is then stored in its memory. Upon failure detection of an application module, the last stored state of that failed application module is retrieved from the memory of Checkpoint Server 110 and provided to the new primary application module for continued processing.

In accordance with the present invention, an application module is made reliable by registering itself for its own failure detection and recovery. Specifically, a centralized ReplicaManager daemon process 112 running on one of the host computers (host computer H2 in FIG. 1) in the network, receives a registration request from each failure-protected application module. The registration request includes for the particular application module the style of replication (i.e., hot, warm, and cold), the degree of replication, a list of the host computers on which the application module resides and where on each such host computer the executable program can be found, and a switching style. The degree of replication specifies the total number of copies of an application module. Thus, for a hot or warm replication style, the degree of replication defines the total number of running copies of an application module that are to be maintained in the network. For a cold replication style, the degree of replication specifies the number of host computers in the network from which the application module can be run. The switching style specifies a fail-over strategy that determines when an application module should be migrated from one host computer to another host computer. With respect to the latter, when a failure of a application module is detected, it can either be restarted on the same host computer on which the failure took place, or it can be migrated to another host computer on which an idle or running backup copy resides. Two fail-over strategies can be specified upon registration of the application module with the ReplicaManager. With the first, known as OnOverThreshold, an application module is migrated to another host computer after the number of times that the application module has failed on a given host computer exceeds a given threshold. Thus, with this strategy, the failed application module is restarted on its own host computer until the number of times the application module fails reaches the threshold number. Thereafter, the failed application module is migrated to another host computer. With the second fail-over strategy, known as OnEachFailure, a failed application module is migrated to another host computer each time a failure occurs.

The ReplicaManager daemon process 112 has consolidated in its memory the replication information for all registered application modules in the network. For each type of application module running in the network, the ReplicaManager stores the information necessary to effect recovery of a running application module or an entire host computer running several different application modules. FIG. 2 illustrates in a table format 200 the type of stored information for the three types of application modules running on the six host computers in FIG. 1. As an example, application module of type A is registered in entry 201 with a warm backup style with a replication degree of three. Thus one primary application module is always running together with two backup copies, with any one of the backup copies being capable of taking over functioning as a primary upon the failure of the primary copy. As can be noted in FIGS. 1 and 2, the primary copy (designated "P" in block 202), $A_1$, is illustratively shown running on H1 and backup copies (designated "B" in blocks 203 and 204), $A_2$ and $A_3$, are shown running on H2 and H3, respectively. An additional copy of application module type A, $A_4$, is shown residing in memory on H4 in an idle state (designated "I" in block 205). The pathname location of each copy of the application module on the host computer is illustratively shown. Application module type B is registered and stored by the ReplicaManager in entry 206 with a hot backup style having a degree of two. Thus, two primary copies of this application module are maintained active and running, each processing client requests and synchronizing states between each other. The first primary copy, $B_1$, is illustratively shown as residing on H4 and the second primary copy, $B_2$, is shown residing on H1. An idle copy, $B_3$, resides on H5. The third application module, type C, is registered in entry 207 with a cold backup style with a degree of two. Thus, a primary copy, $C_1$, is illustratively shown running on H3, and a single idle copy is illustratively shown residing on H6.

As will be discussed, upon detecting a failure of a primary application module having an OnEachFailure switching style or an OnOverThreshold switching style in which the threshold has been reached, a backup application module is designated as a new primary application module in table 200. If the failed application module has a warm or hot backup style, an idle copy of that application module type is executed on its hosting computer to maintain the same level of replication in the network. Similarly, if a running backup copy of an application module is detected as having failed, an idle copy of that application module is started on another host computer to maintain the same number of running copies in the network as specified by the registered degree of replication. Further, as will be discussed, upon detecting a failure of a host computer, table 200 is accessed to determine the identities of the application modules running on that computer as either primary copies or backup copies. Each such primary or backup copy on the failed host computer is then failure protected in the same manner as if each failed individually.

With reference back to FIG. 1, failure detection is effected through a WatchDog daemon process running on each host computer. Each such WatchDog daemon performs the function, once an application module has been registered with the ReplicaManager 112, of monitoring that running application module and all other registered and running application modules on its host computer. Accordingly, WatchDog daemon 113-1 monitors the registered application modules $A_1$ and $B_2$ running on host computer H1; WatchDog daemon 113-2 monitors the registered application module $A_2$ running on host computer H2; WatchDog daemon 113-3 monitors the registered application modules $A_3$ and $C_1$ running on host computer H3; and WatchDog daemon 113-4 monitors the application module $B_1$ running on host computer H4. Since application module $A_4$ in memory in host computer H4 is idle, WatchDog daemon 113-4 does not monitor it until it may later be made active. Similarly, idle application module $B_3$ on host computer H5 and idle application module $C_2$ on host computer H6 are not monitored by WatchDog daemons 113-5 and 113-6, respectively, until they are executed.

The Watchdog daemons 113 running on each host computer support two failure detection mechanisms: polling and heartbeat. In polling, the Watchdog daemon periodically sends a ping message to the application module it is monitoring. If the ping fails, its assumes that the application module has crashed. The polling can also be used to provide a sanity check for an application module calling a sanity-checking method inside the application module. In the heartbeat mechanism, an application module actively sends heartbeats to the Watchdog daemon either on a periodic basis or on a per request basis. If the Watchdog daemon does not receive a heartbeat within a certain duration, the application module is considered to be hung up. The heartbeat mechanism is capable of detecting both crash and hang failures of an application module or a host computer, whereas the polling mechanism is only capable of detecting crash failures. An application module may select one of these two approaches based on its reliability needs.

When a WatchDog daemon detects a crash or a hang of an application module that it is "watching", it reports the failure to the ReplicaManager 112 for fail-over action. As previously noted, if the failed application module has registered with an OnEachFailure fail-over strategy, the failed application module is migrated to another host. Thus, if the failed application module is a primary copy, one of the backup application modules is designated as the new primary and an idle application module is executed to maintain the same degree of replication for which that application module type has registered. Upon promotion of an application module from backup status to primary status, its designation in table 200 is modified, as is the idle application that is executed. If the failed application module is a backup copy, then an idle copy is executed and its designation in table 200 is modified to reflect that change.

As noted in FIG. 1, ReplicaManager 112 is centralized, i.e., there is only one copy of ReplicaManager running in the network. The replication information for each application module running in the network is consolidated in table 200 maintained in the memory of ReplicaManager 112. To prevent loss of this information in case of failures, this ReplicaManager table is checkpointed with Checkpoint Server 110.

In addition to the functionality of the WatchDog daemons running on each host computer, a centralized SuperWatchDog daemon process 115-1 is used to detect and recover from host crashes. All WatchDog daemons register with the SuperWatchDog daemon for such detection of host failures. Failure protection is effected through a heartbeat detection strategy. Thus, each of the WatchDog daemons 113 periodically sends a heartbeat to the SuperWatchDog daemon 115-1. If the SuperWatchDog daemon 115-1 does not receive a heartbeat from any of the WatchDogs 113, it assumes that that WatchDog and the host computer on which it is running have failed. It then initiates failure recover by informing the ReplicaManager 112 of that host computer's failure. Since a centralized SuperWatchDog daemon could itself become a single point of failure, it is itself replicated and the replicas are maintained in a warm replication style. In FIG. 1, SuperWatchDog backup copies 115-2 and 115-3 of SuperWatchDog 115-1 are shown residing on host computers H5 and H6, respectively. The three SuperWatchDog daemons form a logical ring structure. Each SuperWatchDog daemon periodically sends heartbeats to a neighbor SuperWatchDog. Thus, in FIG. 1, the primary SuperWatchDog 115-1 periodically sends a heartbeat to SuperWatchDog 115-2, which, in turn, periodically sends a heartbeat to SuperWatchDog 115-3, which, in turn, periodically sends a heartbeat back to SuperWatchDog 115-1. If a SuperWatchDog does not receive a heartbeat from its neighbor on the ring, it assumes that a failure has occurred. A fail-over procedure for a failed SuperWatchDog is described hereinafter.

As an example of recovery from a crashed or hung application module, reference will be made to application module A, which is registered with ReplicaManager 112 with a warm replication style with a degree of three and with a switching style of OnEachFailure. Initially application module $A_1$ is running on host computer H1 with backups $A_2$ and $A_3$ running on host computers H2 and H3, respectively. Application module $A_1$ is registered with its local WatchDog 113-1 with the detection style of polling, so that WatchDog 113-1 periodically polls application module $A_1$. At some time, application module $A_1$ on host computer H1 crashes, which failure is detected by WatchDog 113-1. WatchDog 113-1 reports that failure to ReplicaManager 112, which looks up its internal table 200 and decides that a primary application module of type A has failed and that backup applications are running on host computers H2 and H3. It promotes one of these backups ($A_2$, for example) to primary status and changes the status of $A_2$ from backup to primary in table 200. It then notes that an idle copy, $A_4$, is resident on host computer H4 at pathname location/home/chung/A.exe, and starts that new backup by informing the WatchDog 113-4 on host computer H4 to execute that copy. Thus, a total of three copies of application module A remain running in the network after detection and recovery from the failure of application module $A_1$ on host computer H1, thereby maintaining the number of running application modules in the network at three, equal to the registered degree of replication. The failure detection and recovery for a hung application module will be exactly the same except in that case, heartbeats, instead of polling, are used as a means for failure detection.

The WatchDog running on each host computer sends heartbeats to the primary SuperWatchDog in the network. Thus, WatchDogs 113-1–113-6 send heartbeats to SuperWatchDog 115-1. When a host crash occurs, the WatchDog running on it crashes and SuperWatchDog 115-1 stops receiving heartbeats from that WatchDog. If, for example, host H1 crashes, SuperWatchDog 115-1 stops receiving heartbeats from WatchDog 113-1. It then declares host computer H1 dead and reports that failure to ReplicaManager 112. ReplicaManager 112 accesses table 200 to determine that application modules $A_1$ and $B_2$ were running of host computer H1. Recovery for $A_1$ is initiated as previously described. Application module $B_2$ is noted to be a primary copy. The idle copy $B_3$ residing on host computer H5 is then executed, thereby maintaining two running primary copies of application module type B in the network. The status of $B_3$ is then updated in table 200 from idle to primary. The failure of a WatchDog daemon running on a host computer is treated in the same manner as a host crash.

When the host computer on which a SuperWatchDog daemon is running crashes, the SuperWatchDog on the next host computer on the logical ring stops receiving heartbeats. Thus, if host computer H6 fails, or SuperWatchDog 115-3 on host computer crashes, SuperWatch Dog 115-1 on host computer H2 stops receiving heartbeats from SuperWatchDog 115-3. It declares SuperWatchDog 115-3 dead and checks to see if the dead SuperWatchDog 115-3 was a primary SuperWatchDog. Since SuperWatchDog 115-3 is a backup, it does not need to take any action on behalf of that SuperWatchDog. The SuperWatchDog 115-2 will then get an exception when it tries to send its heartbeat to the SuperWatchDog on host computer H6. As part of exception handling, SuperWatchDog 115-2 determines the handle for SuperWatchDog 115-1 on host computer H1, registers itself with it and starts sending heartbeats to it.

If host computer H2 fails or SuperWatchDog 115-1 crashes, then SuperWatchDog 115-2 on host computer H5 detects the failure and determines that the primary SuperWatchDog has failed. Backup SuperWatchDog 115-2 then takes over the role of the primary and starts the ReplicaManager daemon on host computer H5. The Watchdogs 113-1–113-6 on host computers H1 through H6, respectively, get exceptions when they attempt to send heartbeats to the SuperWatchDog 115-1 on host computer H2 (which was the primary). As part of the exception handling routine, each WatchDog daemon discovers the new primary SuperWatchDog 115-2, and the ReplicaManager 112 registers itself with the new primary SuperWatchDog 115-2 and starts sending it periodic heartbeats. Since only one copy of the ReplicaManager daemon is running in the network, the state of the ReplicaManager is made persistent by storing the table 200 in the Checkpoint Server 110. Thus, when the ReplicaManager is migrated to host computer H5 with the new primary SuperWatchDog 115-2, the ReplicaManager started on that host loads its state from the Checkpoint Server 110 and reinitializes its internal table from its stored state. Similarly, if the ReplicaManager 112 fails, then its failure is detected by SuperWatchDog 115-1 from the absence of heartbeats. SuperWatch Dog 115-1 then restarts ReplicaManager 112 on the same host computer, loading its state from the Checkpoint Server 110, and reinitializing its internal table 200 from its stored state.

The above-described embodiment is illustrative of the principles of the present invention. Other embodiments may be devised by those skilled in the art without departing from the spirit and scope of the present invention.

What is claimed is:

1. A computer system for fault tolerant computing comprising:

a plurality of host computers interconnected on a network;

one or more copies of an application module each running on a different one of said plurality of host computers;

one or more idle backup copies of the application module each stored on a different one of said host computers;

a manager daemon process running on one of said plurality of host computers, the manager daemon process receiving an indication upon a failure of one of said running copies of the application module and initiating failure recovery; and means for providing a registration message to said manager daemon process, said registration message specifying said application module and a degree of replication of said application module, said degree of replication indicating the number of running copies of the application module to be maintained in the system;

wherein the number of running copies of the application module is maintained at the registered degree of replication by executing at least one of said idle backup copies upon detecting one or more failures, respectively, of any of the running copies of said application module.

2. The computer system of claim 1 further comprising:

a plurality of failure-detection daemon processes each running on and associated with a host computer on which each copy of the application module is running, each of said failure-detection daemon processes monitoring the ability of its associated copy of the application module to continue to run, each failure-detection daemon process sending to said manager daemon process a message indicating a failure of its associated copy of the application module upon detecting its failure.

3. The computer system of claim 2 further comprising:

a checkpoint server connected to the network, said checkpoint server periodically storing the states of each of said running copies of said application module and said manager daemon process.

4. The computer system of claim 3 wherein upon detection of the failure of one of said running copies of said application module, said manager daemon process signals one of said at least one idle backup copies to execute and to assume the processing functions of the failed copy, said one backup copy retrieving from said checkpoint server the last stored state of the failed copy of the application module.

5. The computer system of claim 3 further comprising:

a second failure-detection daemon process running on the same host computer as the manager daemon process, said second failure-detection process monitoring a host computer on which one of the copies of the application module is running for a failure.

6. The computer system of claim 5 wherein upon detection of a failure of the monitored host computer, said manager daemon process signals one of said idle backup copies to execute and to assume the processing functions of the copy of the application module running on the failed host computer, the executed backup copy retrieving from said checkpoint server the last stored state of the copy of the application module running on the failed host computer.

7. The computer system of system of claim 5 further comprising:

a backup copy of said second failure-detection daemon process running on one of said plurality of host computers other than the host computer on which the second failure-detection daemon process is running, said copy of said second failure-detection process monitoring the host computer on which the second failure-detection daemon process is running for a failure.

8. The computer system of claim 7 wherein upon detection of a failure of the host computer on which the second failure-detection daemon process is running, said backup copy of said second failure-detection daemon process assumes the processing functions of said second failure-detection daemon process and initiates running of a copy of said manager daemon process on its own host computer, said copy of said manager daemon process retrieving from said checkpoint server the last stored state of said manager daemon process while it was running on said failed host computer.

9. The computer system of claim 1 wherein the registration message for the application module further specifies a style of replication that indicates whether the replication style for the application module is to be cold, warm or hot.

10. The computer system of claim 4 wherein the registration message for the application module further specifies a fail-over strategy, the fail-over strategy indicating whether one of said idle backup copies should assume the processing functions of a failed one of said running copies each time a failure of that one running copy is detected by said failure-detection process, or whether said one of said idle backup copies should assume the processing functions of said one failed running copy only after the number of failures of that one copy of said application module reaches a predetermined threshold.

11. A fault-managing computer apparatus on a host computer in a computer system, said apparatus comprising:

a manager daemon process for receiving an indication of a failure of a copy of an application module running on at least one of a plurality of host computers in the computer system and for initiating failure recovery with at least one idle backup copy of the application module; and means for receiving a registration message specifying the application module and a degree of replication for the application module, said degree of replication indicating the number of running copies of the application module to be maintained in the system;

wherein the number of running copies of the application module in the system is maintained at the registered degree of replication by executing one of the idle backup copies upon detecting a failure of one of the running copies of the application module.

12. The apparatus of claim 11 wherein upon receiving an indication of a failure of one of the running copies of the application module said manager daemon process signals one of the idle backup copies to assume the processing functions of the failed copy.

13. The apparatus of claim 11 further comprising a failure-detection daemon process for monitoring each host computer in the system for a failure.

14. The apparatus of claim 13 wherein upon said failure-detection daemon process detecting a failure of one of the host computers on which a copy of the application module is running, said manager daemon process signals one of said at least one idle backup copies to assume the processing functions of the copy of the application module on the failed host computer.

15. A fault-tolerant computing apparatus for use in a computer system, said apparatus comprising:

a failure-detection daemon process running on said apparatus, said failure-detection daemon process monitoring the ability of a running copy of an application module to continue to run on said apparatus; and means for sending a registration message to a manager daemon process specifying the application module and a degree of replication to be maintained by the manager daemon process for the application module with respect to the number of running copies of the application module to be maintained in the system;

wherein the number of running copies of the application module in the system is maintained at the registered degree of replication by executing an idle backup copy of the application module on a different computing apparatus upon detecting a failure of the running copy of the application module.

16. The apparatus of claim 15 wherein upon detecting a failure of the running copy of the application module on the apparatus, the idle backup copy of the application module is executed and assumes the processing functions of the failed copy.

17. The apparatus of claim 15 wherein the registration message further specifies a style of replication that indicates that the application module is to be replicated in the computer system with a cold, warm or hot backup style.

18. A method for operating a fault-tolerant computer system, said system comprising a plurality of host computers interconnected on a network, one or more copies of an application module each one running on a different one of said plurality of host computers, and one or more idle backup copies of the application module each stored on a different one of said host computers; said method comprising the steps of:

receiving a registration message specifying the application module and a degree of replication to be maintained for the application module, said degree of replication indicating the number of running copies of the application module to be maintained in the system; and executing at least one of the idle backup copies upon detecting a failure of one of the running copies of the application module to maintain the total number of running copies of the application module in the system at the registered degree of replication.

19. The method of claim 18 further comprising the steps of:

receiving an indication upon a failure of the one of the running copies of the application module; and initiating failure recovery for the failed copy with at least one of the idle backup copies.

20. The method of claim 18 further comprising the steps of:

monitoring one of the host computers on which a copy of the application module is running; and upon detecting a failure of that host computer, initiating failure recovery for the copy of the application module on that host computer with one of the idle backup copies.

21. The method of claim 18 wherein the registration message for the application module further specifies a style of replication that indicates whether the replication style for the application module is to be cold, warm or hot.

22. The method of claim 19 wherein the registration message for the application module further specifies a fail-over strategy, the fail-over strategy indicating whether one of the idle backup copies should assume the processing functions of a failed one of the running copies each time a failure of that one running copy is detected, or whether one of the idle backup copies should assume the processing functions of that one failed running copy only after the number of failures of that one copy a predetermined threshold.

* * * * *